Figure 1:
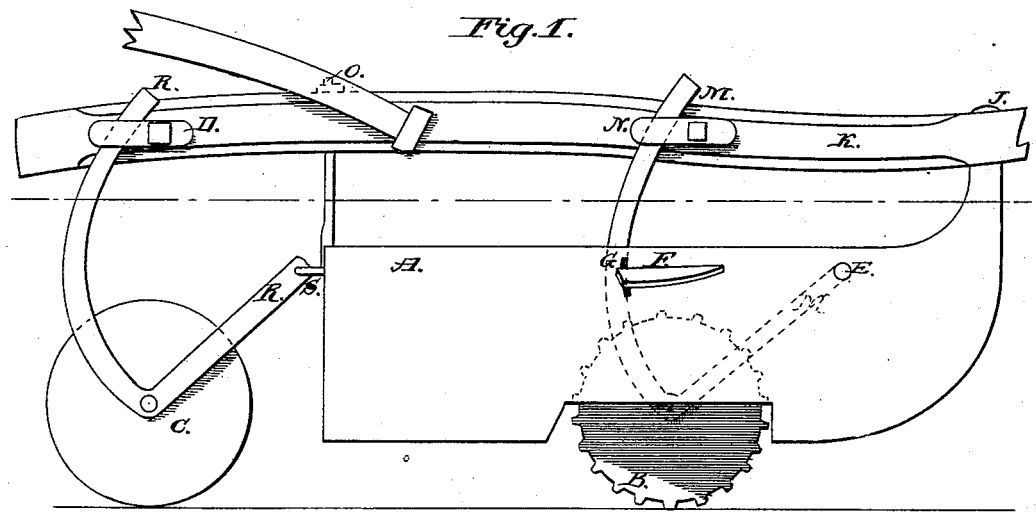
Figure 2:
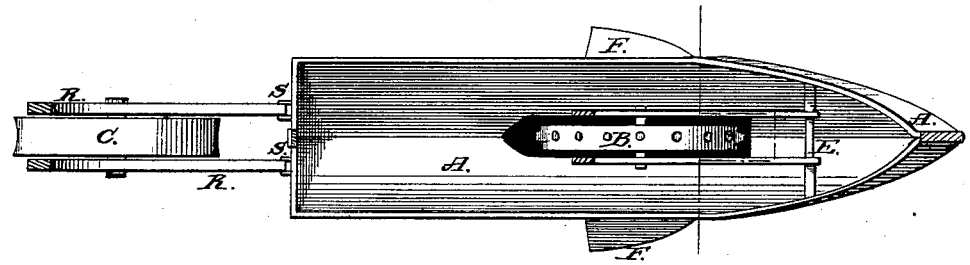
Figure 3:
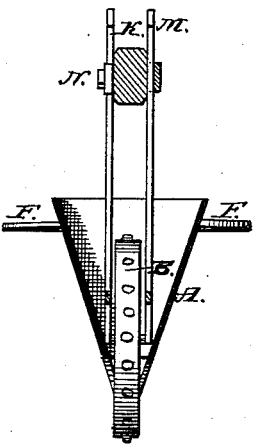

H. F. RICE.
Implements for Destroying Chinch Bugs.

No. 166,720.   Patented Aug. 17, 1875.

Witnesses:

Nelson F. Aars
N. H. Needham

Inventor:

Henry F. Rice

UNITED STATES PATENT OFFICE.

HENRY F. RICE, OF ALLEN COUNTY, KANSAS.

IMPROVEMENT IN IMPLEMENTS FOR DESTROYING CHINCH-BUGS.

Specification forming part of Letters Patent No. 166,720, dated August 17, 1875; application filed March 6, 1875.

*To all whom it may concern:*

Be it known that I, HENRY F. RICE, of Allen county, State of Kansas, have invented an Implement for Destroying Chinch-Bugs, of which the following is a specification:

The object of my invention is, to form a ditch alongside of, or around, fields of growing grain, into which ditch will fall the chinch-bugs that may be approaching such fields.

The implement is made and operated as follows, and shown in the accompanying drawing, to wit:

To a beam, K, like that used in a common plow, is attached, at J and O, a heavy boat-shaped plow, A. The implement, being drawn and operated as a common plow, forms a smooth, deep, and narrow ditch. This ditch is to be formed around, or alongside of, fields of growing grain when danger to such grain is apprehended from the attacks of the insect known as the chinch-bug. At the bottom of a ditch so formed there would naturally be quite a quantity of pulverized earth. As the chinch-bugs approach a field around which has been made such a ditch they will come to, and fall into, the ditch, and upon the pulverized earth. The bugs travel early in the day, and, having fallen into the ditch on a clear day, the sun, from 12 o'clock m. to 2 o'clock p. m., by its direct intense heat, and its reflection from the sides of the ditch, effectually destroys all bugs therein collected. A wheel, B, is swung inside said plow A, being drawn by bars M, which connect with the shaft E. Said bars also continue upward from the wheel B, on each side of the beam K, and are held in place by clamps N on beam K. A wheel, C, is swung behind the plow A, being drawn by bars R, which connect with the plow A by staples at S. Said bars also continue upward from the wheel C, on each side of beam K, and are held in place by clamps D on beam K. The wheels B and C can be raised or lowered, as necessary.

On a cloudy day, when the sun will not effect the destruction of the bugs, as before explained, the wheels B and C are lowered below the plow A, an opening in the bottom of of the plow A at H allowing the wheel B to drop through. The wheel B has round teeth upon its face, in shape the frustum of a cone, one and one-half inch long.

The implement being drawn along in the ditch formed as aforesaid, into which chinch-bugs have been collected, the teeth on the wheel B force the bugs into the pulverized earth, and, the hind wheel C following, having a broad concave face, completely buries and covers the bugs in holes made by the teeth of the wheel B, and thus effecting the destruction of the chinch-bugs.

Flanges F, pivoted at their forward ends on each side of the plow A, and secured by a bolt passing through the slot G, are raised or lowered as needed, and assist in pulverizing the earth collected in the bottom of the ditch.

I claim as my invention—

A machine or implement as hereinbefore described, consisting of the body A, wings F F, and beam K, in combination with the toothed wheel B and covering-wheel C, adjusted and arranged as specified, and operated as hereininbefore described, for the purpose of effecting the destruction of the insect known as the chinch-bug.

HENRY F. RICE.

Witnesses:
NELSON F. ACERS,
HERBERT A. NEEDHAM.